(12) United States Patent
Hogg

(10) Patent No.: US 7,092,186 B1
(45) Date of Patent: Aug. 15, 2006

(54) DEMAGNETIZING A HEAD IN A DISK DRIVE BY INCREASING THE FREQUENCY OF AN AC WRITE SIGNAL WHILE MAINTAINING THE WRITE CURRENT AMPLITUDE

(75) Inventor: Dennis W. Hogg, Laguna Hills, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 30 days.

(21) Appl. No.: 10/996,116

(22) Filed: Nov. 23, 2004

(51) Int. Cl.
G11B 15/04 (2006.01)
G11B 19/04 (2006.01)
G11B 5/02 (2006.01)
G11B 5/03 (2006.01)
G11B 5/09 (2006.01)

(52) U.S. Cl. .............. 360/60; 360/46; 360/66; 360/68

(58) Field of Classification Search .............. None
See application file for complete search history.

(56) References Cited

U.S. PATENT DOCUMENTS

| | | | | |
|---|---|---|---|---|
| 2,912,521 A | * | 11/1959 | De Neit et al. | 360/66 |
| 3,591,729 A | * | 7/1971 | Camras | 360/119 |
| 4,135,219 A | | 1/1979 | Yoshizawa et al. | |
| 4,224,649 A | * | 9/1980 | Alexandrovich, Sr. | 360/128 |
| 4,970,621 A | | 11/1990 | Gailbreath et al. | |
| 5,168,395 A | | 12/1992 | Klaassen et al. | |
| 2005/0200997 A1 | * | 9/2005 | Cronch et al. | 360/55 |

* cited by examiner

*Primary Examiner*—Wayne Young
*Assistant Examiner*—Daniell L. Negrón
(74) *Attorney, Agent, or Firm*—Howard H. Sheerin, Esq.

(57) ABSTRACT

A disk drive is disclosed which demagnetizes the head after a write operation. Write circuitry applies a write signal to the head in order to write data to a selected data sector during a write operation, wherein the write signal comprises a predetermined write current amplitude. Control circuitry demagnetizes the head at the end of the write operation by maintaining the write current amplitude while increasing a frequency of an AC write signal applied to the head over a predetermined demagnetization interval, wherein increasing the frequency of the AC write signal decreases an amplitude of the AC write signal when observed at the head.

6 Claims, 3 Drawing Sheets

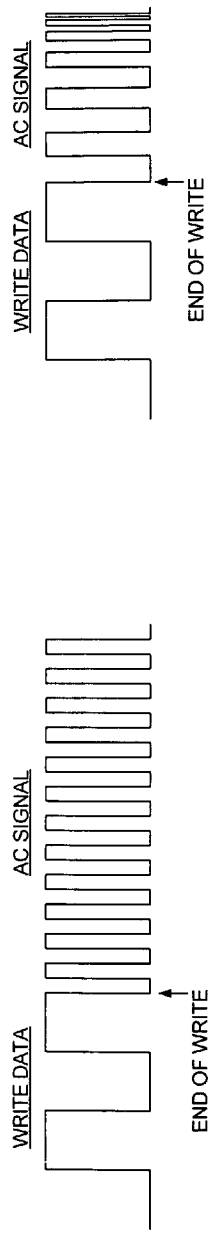
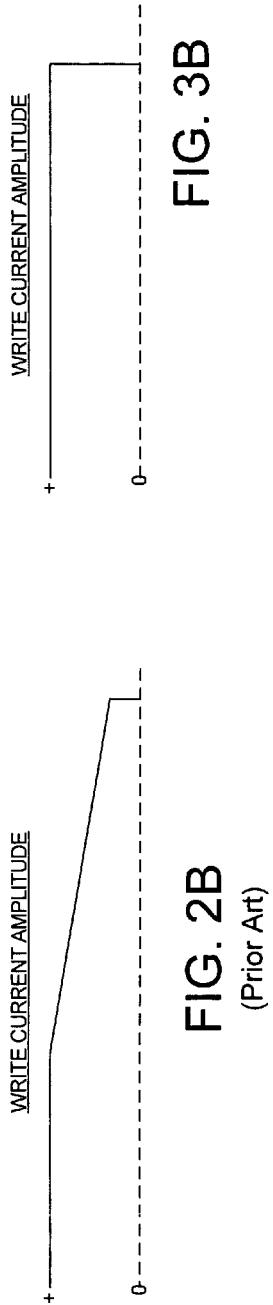
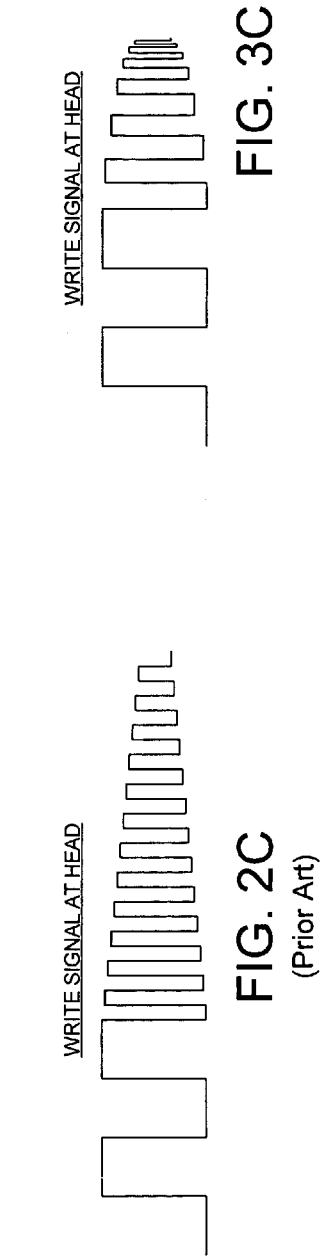

DEMAGNETIZING A HEAD IN A DISK DRIVE BY INCREASING THE FREQUENCY OF AN AC WRITE SIGNAL WHILE MAINTAINING THE WRITE CURRENT AMPLITUDE

BACKGROUND OF THE INVENTION

1. Field of the Invention

The present invention relates to disk drives. In particular, the present invention relates to demagnetizing the head in a disk drive by increasing the frequency of an AC write signal while maintaining the write current amplitude.

2. Description of the Prior Art

FIG. 1 is a prior art recording format showing a plurality of embedded servo sectors $2_0$–$2_N$ recorded on the disk 4 of a disk drive which define a plurality of radially-spaced, concentric data tracks 6. Each data track 6 is partitioned into a plurality of data sectors wherein the servo sectors $2_0$–$2_N$ are considered "embedded" in the data sectors. Each servo sector (e.g., servo sector 24) comprises a preamble 8 for synchronizing gain control and timing recovery, a sync mark 10 for synchronizing to a servo data field 12 comprising coarse head positioning information such as a Gray coded track addresses for use during seeking, and servo bursts 14 which provide fine head positioning information for use during tracking. In a "headerless" format, the servo data field 12 also includes information identifying the data sectors between the servo sectors.

User data is written to a data sector by modulating the write current applied to a head 16, which magnetizes the surface of the disk 4. With conventional longitudinal magnetic recording, the head 16 magnetizes a thin film layer in a planar direction and in the more recent perpendicular magnet recording, the head 16 magnetizes the thin film layer in a perpendicular direction. In either case, the head 16 may remain magnetized after a write operation creating a magnetic field that can erase data in the following data sectors. A prior art technique (such as disclosed in U.S. Pat. No. 5,168,395) teaches to demagnetize the head 16 after every write operation by applying an AC write signal to the head 16 while gradually decreasing the write current amplitude. This technique is illustrated in FIGS. 2A–2C wherein FIG. 2A shows the write data applied to the write circuitry, including an AC write signal at the end of the write operation. The write current amplitude is gradually decreased as shown in FIG. 2B, which decreases the amplitude of the AC, write signal when observed at the head 16 as shown in FIG. 2C. As the amplitude of the AC write signal decreases the head 16 is demagnetized. A problem with this technique, however, is the difficulty and expense involved with controlling the write current amplitude at the end of every write operation. In addition, the AC write signal must be applied over a sufficient interval to guarantee demagnetization which requires a corresponding "gap" at the end of each data sector. This gap is undesirable since it decreases the amount of disk space available for storing user data (i.e., decreases format efficiency).

There is, therefore, a need to simplify head demagnetization in a disk drive in a manner that improves format efficiency.

SUMMARY OF THE INVENTION

The present invention may be considered as a disk drive comprising a disk having a plurality of tracks, wherein each track comprises a plurality of data sectors and a head is actuated over the disk. Write circuitry applies a write signal to the head in order to write data to a selected data sector during a write operation, wherein the write signal comprises a predetermined write current amplitude. Control circuitry demagnetizes the head at the end of the write operation by maintaining the write current amplitude while increasing a frequency of an AC write signal applied to the head over a predetermined demagnetization interval, wherein increasing the frequency of the AC write signal decreases an amplitude of the AC write signal when observed at the head.

In one embodiment, the control circuitry comprises a frequency synthesizer for generating a write frequency, and a ramp circuit for generating a ramp signal applied to the frequency synthesizer to gradually increase the write frequency.

In another embodiment, the control circuitry comprises a timer for timing the predetermined demagnetization interval.

The present invention may also be regarded as a method of demagnetizing a head in a disk drive at the end of a write operation, the disk drive comprising a disk wherein the head is actuated over the disk. A write signal is applied to the head in order to write data to the disk during the write operation, wherein the write signal comprises a predetermined write current amplitude. The head is demagnetized at the end of the write operation by maintaining the write current amplitude while increasing a frequency of an AC write signal applied to the head over a predetermined demagnetization interval, wherein increasing the frequency of the AC write signal decreases an amplitude of the AC write signal when observed at the head.

BRIEF DESCRIPTION OF THE DRAWINGS

FIGS. 2A–2C show a prior art technique for demagnetizing the head after a write operation by applying an AC write signal to the head while decreasing the write current amplitude over a predetermined demagnetization interval.

FIGS. 3A–3C show a technique according to an embodiment of the present invention for demagnetizing the head after a write operation by increasing the frequency of an AC write signal applied to the head while maintaining the write current amplitude over a predetermined demagnetization interval.

DESCRIPTION OF THE PREFERRED EMBODIMENTS

Figure 1:
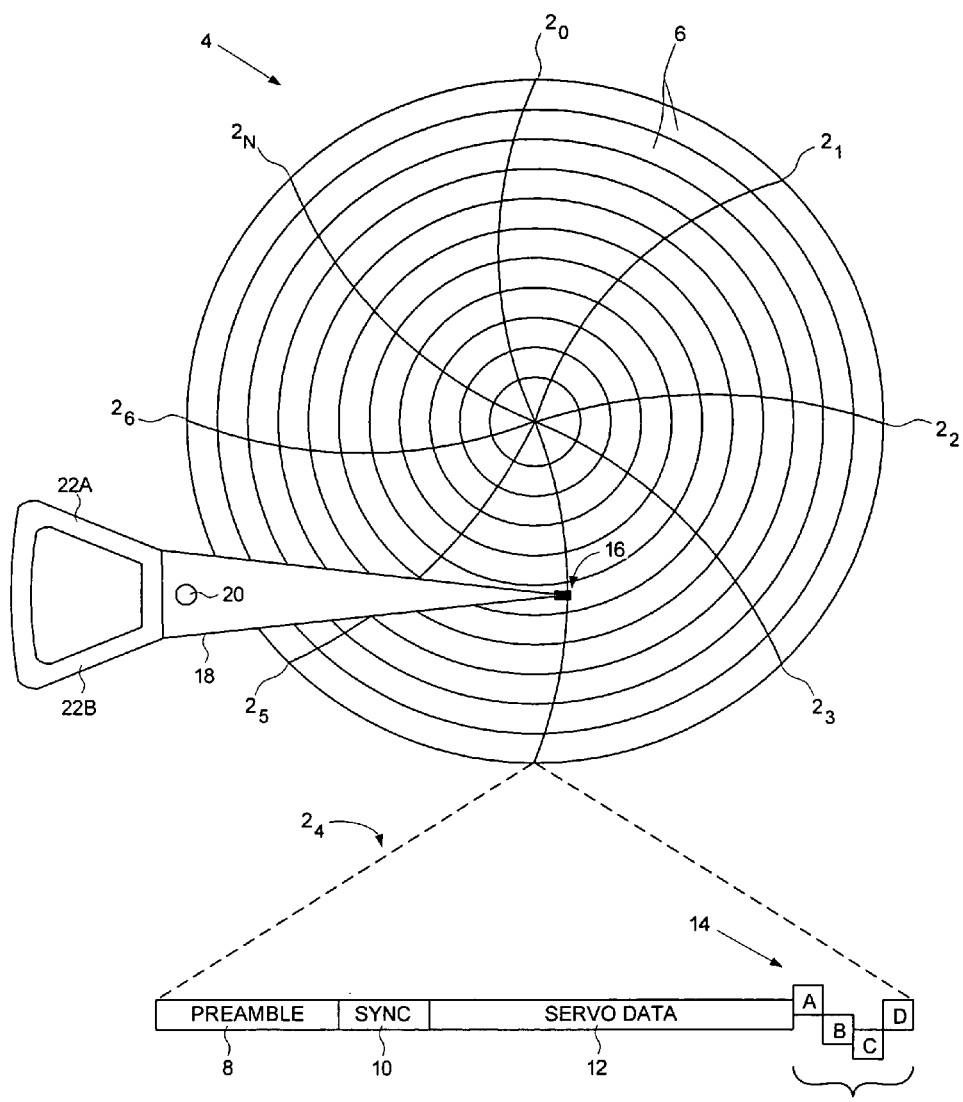
FIG. 1 shows a prior art disk drive comprising a disk having a plurality of tracks with embedded servo sectors and a head actuated radially over the disk.

FIGS. 3A–3C and FIG. 4 show a disk drive according to an embodiment of the present invention comprising a disk 4 having a plurality of tracks 6, wherein each track comprises a plurality of data sectors and a head 16 is actuated over the disk 4. Write circuitry 24 applies a write signal 26 to the head 16 in order to write data (FIG. 3A) to a selected data sector during a write operation, wherein the write signal 26 comprises a predetermined write current amplitude (FIG. 3B). Control circuitry 28 demagnetizes the head 16 at the end of the write operation by maintaining the write current amplitude while increasing a frequency of an AC write signal (FIG. 3A) applied to the head 16 over a predetermined demagnetization interval, wherein increasing the frequency of the AC write signal decreases an amplitude of the AC write signal when observed at the head 16 (FIG. 3C).

The aspects of the present invention are further understood by comparing the prior art technique shown in FIGS. 2A–2C to the technique of the embodiment shown in FIGS. 3A–3C. In FIG. 2A the frequency of the AC write signal applied to the head after a write operation is constant over a predetermined demagnetization interval, whereas in FIG. 3A the frequency of the AC write signal is increased over a predetermined demagnetization interval. In FIG. 2B the write current amplitude is reduced over the predetermined demagnetization interval, whereas in FIG. 3B the write current amplitude is maintained over the predetermined demagnetization interval. In FIG. 2C the amplitude of the AC write signal decreases over the predetermined demagnetization interval when observed at the head due to decreasing the write current amplitude, whereas in FIG. 3C the amplitude of the AC write signal decreases over the predetermined demagnetization interval due to the attenuating frequency response of the write channel as the frequency of the AC write signal increases.

A significant benefit of the technique illustrated in FIGS. 3A–3C is that maintaining the write current amplitude while increasing the frequency of the AC write signal demagnetizes the head faster as compared to the prior art technique of decreasing the write current amplitude. As a result, the technique of the present invention decreases the length of the gap following each data sector, which increases format efficiency.

Any suitable parameters of the AC write signal may be employed in the embodiments of the present invention, including any suitable starting frequency, any suitable function for increasing the frequency, and any suitable demagnetization interval for demagnetizing the head. A suitable AC write signal may be determined by evaluating the average frequency response of the write channel over a number of production disk drives. Each production disk drive may then be manufactured with a nominal AC write signal. In an alternative embodiment, an optimal AC write signal is determined for each production disk drive during a calibration mode while in manufacturing or while in-the-field. The calibration mode may include the steps of performing test write operations and evaluating the read signal during the demagnetization interval. At least one parameter of the AC write signal (starting frequency, frequency function, and demagnetization interval) is then adjusted until the AC write signal is optimized. For example, the parameters of the AC write signal may be adjusted until the amplitude of the read signal over the demagnetization interval indicates the head has been sufficiently demagnetized. In one embodiment, the parameters of the AC write signal are adjusted until achieving the shortest demagnetization interval in order to minimize the gap following each data sector.

In the embodiment of the present invention shown in FIG. 3A the frequency of the AC write signal is increased linearly over the demagnetization interval. However, any suitable function may be employed to increase the frequency of the AC write signal, such as an exponential function or a polynomial function. In one embodiment, a number of different functions are tried to determine the optimal function (either on average or for each individual production disk drive).

Figure 4:
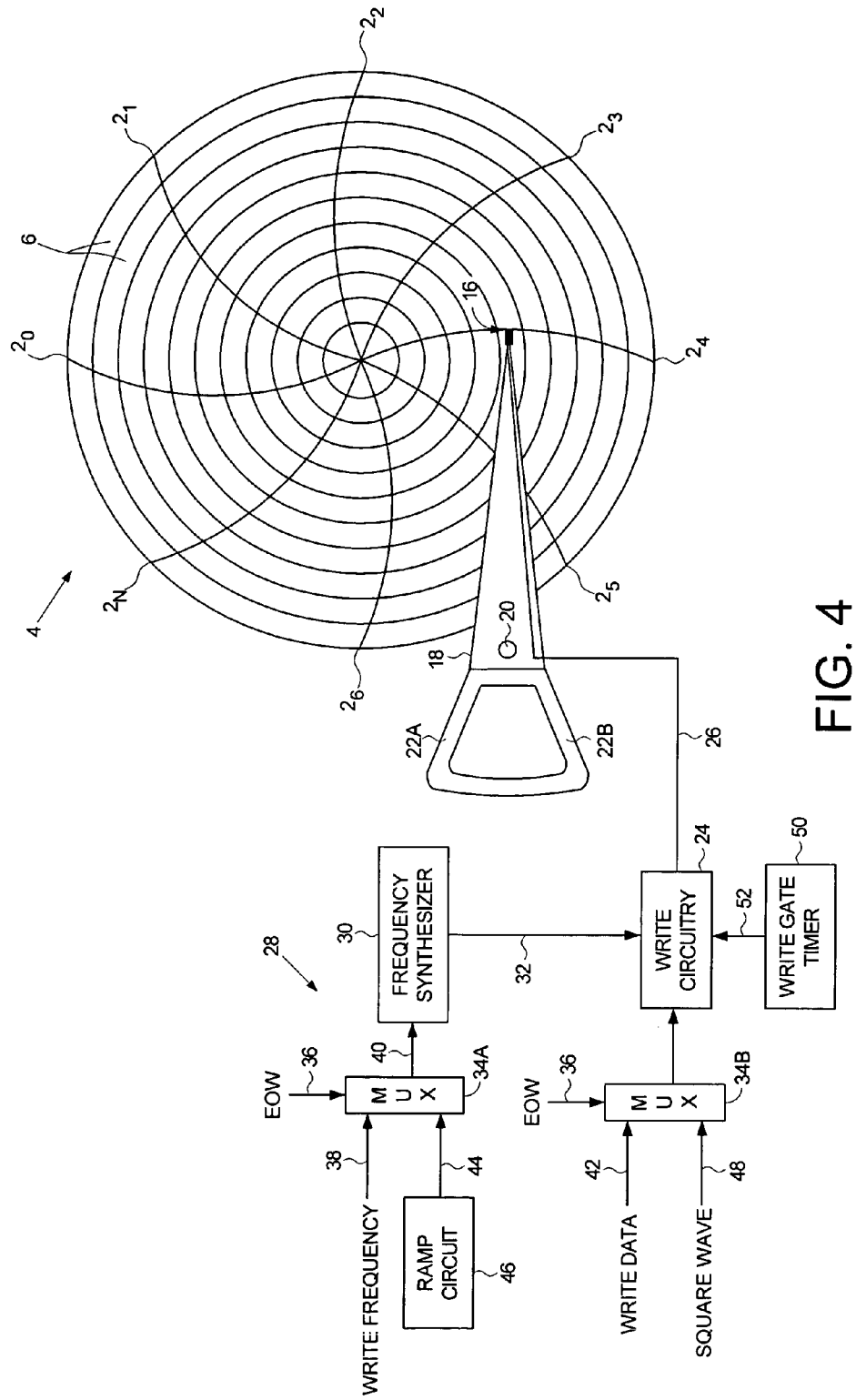
FIG. 4 shows a disk drive according to an embodiment of the present invention wherein a ramp signal is applied to a frequency synthesizer in order to increase the frequency of the AC write signal applied to the head at the end of a write operation.

FIG. 4 shows suitable circuitry for generating the AC write signal according to an embodiment of the present invention. A frequency synthesizer 30 generates a write frequency 32 applied to the write circuitry 24, wherein the write circuitry 24 modulates the write signal 26 applied to the head 16 at the write frequency 32. A first multiplexer 34A and a second multiplexer 34B are controlled by an end of write (EOW) signal 36. While writing user data to a data sector the first multiplexer 34A selects a write frequency control signal 38 as the control input 40 to the frequency synthesizer 30 to generate the appropriate write frequency 32, and the second multiplexer 34B selects the write data 42 corresponding to the user data as the input to the write circuitry 24. At the end of the write operation, the EOW signal 36 configures the first multiplexer 34A to select a ramp control signal 44 generated by a ramp circuit 46 as the control input 40 to the frequency synthesizer 30 to generate an increasing write frequency 32, and the EOW signal 36 configures the second multiplexer 34B to select a square wave 48 as the input to the write circuitry 24. A write gate timer 50 generates a write gate signal 52 for enabling the write circuitry 24 over the duration of the write operation including the demagnetization interval.

The invention claimed is:

1. A disk drive comprising:
    (a) a disk comprising a plurality of tracks, wherein each track comprises a plurality of data sectors;
    (b) a head actuated over the disk;
    (c) write circuitry for applying a write signal to the head in order to write data to a selected data sector during a write operation, wherein the write signal comprises a predetermined write current amplitude; and
    (d) control circuitry for demagnetizing the head at the end of the write operation by maintaining the write current amplitude while increasing a frequency of an AC write signal applied to the head over a predetermined demagnetization interval, wherein increasing the frequency of the AC write signal decreases an amplitude of the AC write signal when observed at the head.

2. The disk drive as recited in claim 1, wherein the control circuitry comprises:
    (a) a frequency synthesizer for generating a write frequency; and
    (b) a ramp circuit for generating a ramp signal applied to the frequency synthesizer to gradually increase the write frequency.

3. The disk drive as recited in claim 1, wherein the control circuitry comprises a timer for timing the predetermined demagnetization interval.

4. A method of demagnetizing a head in a disk drive at the end of a write operation, the disk drive comprising a disk, and the head actuated over the disk, the method comprising the steps of:
    (a) applying a write signal to the head in order to write data to the disk during the write operation, wherein the write signal comprises a predetermined write current amplitude; and
    (b) demagnetizing the head at the end of the write operation by maintaining the write current amplitude while increasing a frequency of an AC write signal applied to the head over a predetermined demagnetization interval, wherein increasing the frequency of the AC write signal decreases an amplitude of the AC write signal when observed at the head.

5. The method as recited in claim 4, wherein the step of increasing the frequency of the AC write signal comprises the step of applying a ramp signal to a frequency synthesizer.

6. The method as recited in claim 4, further comprising the step of timing the predetermined demagnetization interval.

* * * * *